(12) United States Patent
Reusch et al.

(10) Patent No.: US 11,234,361 B2
(45) Date of Patent: Feb. 1, 2022

(54) SYSTEM AND METHOD FOR DETERMINING A PLANT STATUS

(71) Applicant: YARA INTERNATIONAL ASA, Oslo (NO)

(72) Inventors: Stefan Reusch, Dülmen (DE); Lars Wuntke, Oberursel/Ts (DE); Daniel Stephan, Oberursel/Ts (DE); Christoph Mattolat, Oberursel/Ts (DE)

(73) Assignee: YARA INTERNATIONAL ASA, Oslo (NO)

( * ) Notice: Subject to any disclaimer, the term of this patent is extended or adjusted under 35 U.S.C. 154(b) by 275 days.

(21) Appl. No.: 16/473,003

(22) PCT Filed: Dec. 27, 2017

(86) PCT No.: PCT/EP2017/084607
§ 371 (c)(1),
(2) Date: Jun. 24, 2019

(87) PCT Pub. No.: WO2018/122236
PCT Pub. Date: Jul. 5, 2018

(65) Prior Publication Data
US 2020/0084958 A1    Mar. 19, 2020

(30) Foreign Application Priority Data

Dec. 27, 2016 (EP) .................... 16206925

(51) Int. Cl.
*H05B 47/155* (2020.01)
*A01G 7/04* (2006.01)
(Continued)

(52) U.S. Cl.
CPC .............. *A01C 21/007* (2013.01); *A01G 7/00* (2013.01); *A01G 25/16* (2013.01); *H05B 47/105* (2020.01); *H05B 47/155* (2020.01)

(58) Field of Classification Search
CPC .... H05B 47/11; H05B 47/105; H05B 47/155; H05B 47/10; H05B 45/20; H05B 45/22;
(Continued)

(56) References Cited

U.S. PATENT DOCUMENTS 3,910,701 A * 10/1975 Henderson ........... G01N 21/474
356/39
7,408,145 B2 * 8/2008 Holland .................... G01J 3/10
250/205

(Continued)

FOREIGN PATENT DOCUMENTS

| CN | 101363797 | 2/2009 |
| CN | 101784885 | 7/2010 |
| EP | 2 638 797 | 9/2013 |

OTHER PUBLICATIONS

International Search Report dated Apr. 18, 2018 in International (PCT) Application No. PCT/EP2017/084607.

*Primary Examiner* — Haissa Philogene
(74) *Attorney, Agent, or Firm* — Wenderoth, Lind & Ponack, L.L.P.

(57) ABSTRACT

The invention relates to a system and method for determining a status of plants. The system includes a light transmitter arranged for providing broad band illumination to one or more plants. The system includes a light receiver including a plurality of receiver channels, the receiver channels arranged for receiving light from said one or more plants in mutually different wavelength bands. The system includes a processing unit arranged for determining a status of said one or more plants on the basis of light received by the plurality of receiver channels. The transmitter may be arranged for transmitting bursts of modulated light.

21 Claims, 5 Drawing Sheets

(51) Int. Cl.
*A01C 21/00* (2006.01)
*H05B 47/105* (2020.01)
*A01G 7/00* (2006.01)
*A01G 25/16* (2006.01)

(58) Field of Classification Search
CPC .......... A01G 7/00; A01G 25/16; A01G 7/045; A01G 9/249; A01G 7/04; A01C 21/007; G05B 19/042; G01J 3/10; G01J 3/36; G01N 21/359; G01N 2021/635; G01N 2021/8466; G01N 2021/3155
See application file for complete search history.

(56) References Cited

U.S. PATENT DOCUMENTS

| | | | |
|---|---|---|---|
| 9,408,275 B2* | 8/2016 | Maxik | A01G 7/045 |
| 9,886,016 B2* | 2/2018 | Bermudez Rodriguez | G05B 15/02 |
| 10,209,181 B2* | 2/2019 | Shearer | A01G 7/00 |
| 10,222,475 B2* | 3/2019 | Pacala | G01S 7/4863 |
| 10,365,157 B2* | 7/2019 | Ramer | G01J 3/2823 |
| 10,816,939 B1* | 10/2020 | Coleman | G01S 17/86 |
| 10,837,758 B2* | 11/2020 | Reusch | H04N 13/239 |
| 2005/0072935 A1 | 4/2005 | Lussier | |
| 2005/0098713 A1 | 5/2005 | Holland | |
| 2005/0281027 A1 | 12/2005 | Capen et al. | |
| 2011/0047867 A1 | 3/2011 | Holland | |
| 2011/0186752 A1 | 8/2011 | Moise et al. | |
| 2020/0068810 A1* | 3/2020 | Pahlevaninezhad | H01L 25/0753 |
| 2020/0221645 A1* | 7/2020 | Quilici | G01S 7/484 |

\* cited by examiner

SYSTEM AND METHOD FOR DETERMINING A PLANT STATUS

FIELD OF THE INVENTION

The invention relates to a system and method for determining a plant status, such as one or more biophysical parameters of plants, e.g. biomass and/or nitrogen uptake.

BACKGROUND TO THE INVENTION

It is known to determine a plant status, such as a plant nutritional status with the help of chlorophyll content. The chlorophyll content is usually determined by means of optical reflectance measurements. Artificial light sources are sometimes used in order to increase independence from ambient light conditions.

SUMMARY OF THE INVENTION

It is an objective to provide an improved system for determining a status of plants.

According to the invention is provided a system for determining a status of plants. The system includes a light transmitter arranged for transmitting broad band light to one or more plants. The system includes a light receiver including a plurality of receiver channels, the receiver channels arranged for receiving light from said one or more plants in mutually different wavelength bands. The system includes a processing unit arranged for determining a status of said one or more plants on the basis of light received by the plurality of receiver channels.

According to an aspect the light transmitter is arranged for transmitting the light in modulated bursts. A burst can include a plurality of pulses of light. The light transmitter can be arranged for alternately during a first period transmitting modulated light and during a second period transmitting substantially no light. Hence, the light transmitter can alternate between transmitting a burst of pulses of light and transmitting substantially no light. Optionally, the receiver is arranged for receiving light in synchronization with the modulation of the light transmitter. Transmitting the light in modulated bursts or as an alternating light signal has the advantage that due to the modulation of the light, ambient light can be suppressed. The processing unit can be arranged for suppressing ambient light. Moreover, during the bursts, high levels of illumination can be achieved while reducing thermal load of the light transmitter.

According to an aspect, the light transmitter includes a plurality of transmitter channels. The transmitter channels can be arranged for transmitting light in mutually different wavelength bands. Each transmitter channel can include one or more individual light sources. This provides the advantage that the broadband light can be provided by a plurality of transmitter channels. Hence, the spectrum of the broadband light can easily be tuned. Also, degradation of light sources over time can be compensated by regularly measuring the actual intensity of every transmitter channel through a photodiode situated inside the transmitter.

Optionally, the number of transmitter channels is different from, such as smaller than or larger than, the number of receiver channels. Hence, there is no one-on-one correspondence between transmitter channels and receiver channels. This provides the advantage that the center wavelengths of the receiver can be more flexibly adapted to the actual needs and are—at least to some extent—not relying on the physical availability of light sources with certain center wavelengths. For instance, the center wavelength of a receiver channel, or the light receiver, can be adjusted using one or more filters, such as interference filters. However, the number of transmitter channels can also be equal to the number of receiver channels.

Optionally, a center wavelength of a wavelength band of at least one of the transmitter channels is different from the center wavelengths of the wavelength bands of the receiver channels. Optionally, a center wavelength of a wavelength band of at least one of the receiver channels is different from the center wavelengths of the wavelength bands of the transmitter channels. Hence, there is no one-on-one correspondence between transmitter channels and receiver channels.

According to an aspect, the transmitter channels are optically mixed through dedicated transmitter optics to one single optical axis. This provides the advantage that the spectrum of the illumination light provided by the plurality of transmitter channels is substantially homogeneous over a field of illumination around the optical axis. Also, partial shading of the optics (e.g. dirt or the like) does not, or insignificantly, change the spectral composition of the illumination.

Optionally, the intensities of the individual transmitter channels can be monitored and/or controlled through an optical receiver situated inside the transmitter optics. This allows for correcting the individual transmitter channels for degradation, e.g. of the light sources. Additionally, or alternatively, this allows for checking transmitter channel functionality, and e.g. generate an alarm if a transmitter channel (e.g. a light source thereof) is not, or not properly working.

According to an aspect, each receiver channel includes at least one light detector. The receiver can include a multiplexer for multiplexing measurement signals from the individual receiver channels into a single receiver signal. The receiver can include one or more analog to digital converters, ADC. Optionally, the multiplexer is placed upstream of an ADC. This provides the advantage that analog signals from the individual receiver channels can be multiplexed first and digitized next. Hence, a single digital signal can be constructed using a single ADC.

According to an aspect, each receiver channel can include an AC-coupled current to voltage (AC-CV) converter, a bandpass-AC-amplifier, a phase rectifier, an integrator, and a hold circuit. Hence, light emitted by the light transmitter as a modulated burst, e.g. as pulses, and reflected by plants can be received by the at least one light detector, such as a photodiode. An AC-coupled current to voltage converter must be included for converting the light detector signal into a voltage. The signal is amplified in the bandpass-AC-amplifier. The AC-CV converter and the bandpass-AC-amplifier suppresses any DC component in the received signal. The phase rectifier rectifies the signal dependent on the phase of the received signal, so as to obtain the amplitude of the signal. Phased rectification allows to discriminate between signals of similar amplitude but different phase. Preferably, the phase rectifier is synchronized with the light transmitter. The integrator integrates the light received during emission of (part of) the burst of light. This is representative for the amount of transmitted light reflected by the plants. Also, the integrator provides improved noise suppression. The integrated signal can be held by the hold circuit until the multiplexer allows transfer of the signal to the ADC. Hence, the multiple receiver channels can be digitized by a single ADC.

The system can include a signal generator for generating a carrier frequency. The carrier frequency can determine the pulse frequency of the light transmitter. Preferably, the signal generator is connected to both the light transmitter and the light receiver. Hence, synchronization between the light transmitter and light receiver can be obtained.

In addition to the carrier frequency, the system can also be arranged to set a burst frequency and burst duration and optionally pulse duration. Optionally, the carrier frequency, the burst frequency, burst duration and optional pulse duration are adjustable.

According to an aspect, each receiver channel includes a light detector and dedicated optics, such as a bandpass filter and/or lens. Optionally, the mechanical parts of all receiver channels are mounted in a common receiver frame. This can help minimize signal drift among receiver channels, e.g. due to temperature differences.

According to an aspect, the system includes a light receiver including a plurality of receiver channels, the receiver channels being arranged for receiving light in mutually different wavelength bands.

According to an aspect, a first receiver channel is arranged for receiving light at a wavelength of a known reflection or absorption band of interest. Optionally, a second receiver channel is arranged for receiving light at a different wavelength. Optionally, the second receiver channel is arranged for receiving light at a wavelength adjacent to said absorption band of interest. Light received by the second receiver channel can be used as a reference value in view of light received by the first receiver channel. The processing unit can e.g. be arranged for determining a ratio of data representative of light received by the second receiver channel and data representative of light received by the first receiver channel. The processing unit can e.g. be arranged for dividing data representative of light received by the second receiver channel by data representative of light received by the first receiver channel.

According to one embodiment, the light received by the plurality of receiver channels, is indicative for the chlorophyll content of the one or more plant illuminated by the broad band illumination.

Optionally, the light receiver includes a chlorophyll receiver channel tuned to an edge of the chlorophyll absorption band, such as at about 730 nm. Said chlorophyll receiver channel can be arranged to have a sensitivity in a wavelength range including the chlorophyll absorption band. Hence, said chlorophyll receiver channel is sensitive to absorption of transmitted light by chlorophyll of plants illuminated by the light transmitter. Hence, said chlorophyll receiver channel can provide data, representative of the presence and amount of chlorophyll within a field of view of said chlorophyll receiver channel. Optionally, a chlorophyll reference receiver channel is included, arranged to have a sensitivity in a wavelength range, close to the chlorophyll absorption band, such as from about 760 to 800 nm, having no or at least reduced sensitivity at the chlorophyll absorption band. Said chlorophyll reference channel can be used as a reference for the chlorophyll determination. Optionally, the processing unit can be arranged to calculate a ratio of amounts of light received by the chlorophyll receiver channel and the chlorophyll reference receiver channel. Optionally, the processing unit can be arranged to calculate a ratio of signals representative of the amounts of light received by the chlorophyll receiver channel and the chlorophyll reference receiver channel.

Optionally, the light receiver includes a water receiver channel tuned to a water absorption band, such as at about 970 nm. Said water receiver channel can be arranged to have a sensitivity in a wavelength range including the water absorption band. Hence said water receiver channel is sensitive to absorption of transmitted light by water in or on plants illuminated by the light transmitter. Hence said water receiver channel can provide data representative of the presence and amount of water within a field of view of said water receiver channel. Optionally, a water reference receiver channel is included arranged to have a sensitivity in a wavelength range close to the water absorption band, such as at about 900-930 nm, having no or at least reduced sensitivity at the water absorption band. Said water reference channel can be used as a reference for the water determination. Optionally, the processing unit can be arranged to calculate a ratio of amounts of light received by the water receiver channel and the water reference receiver channel. Optionally, the processing unit can be arranged to calculate a ratio of signals representative of the amounts of light received by the water receiver channel and the water reference receiver channel.

Optionally, the system includes a third receiver channel arranged for receiving light at a third wavelength different from the first and second wavelengths, wherein the system is arranged for using light received by the third receiver channel as a reference value in view of light received by the first receiver channel and in view of light received by the second receiver channel. Optionally, the third receiver channel is a reference receiver channel tuned to a reference absorption band, such as about 670 nm. Said reference receiver channel can be arranged to have a sensitivity in a wavelength range including the reference wavelength. Hence said reference receiver channel can provide additional reference, e.g. for the purpose for suppressing effects of dew and/or dust on the plants. The processing unit can be arranged to subtract a signal received by the reference receiver channel from the signal received by the chlorophyll receiver channel and the chlorophyll reference receiver channel before determining the ratio thereof. The processing unit can be arranged to subtract a signal received by the reference receiver channel from the signal received by the water receiver channel and the water reference receiver channel before determining the ratio thereof.

Optionally, the light receiver includes receiver channels having a sensitivity in wavelength bands around 670, 730, 740, 760, 900 or 970 nm, respectively. Optionally, the wavelength bands have a full width at half maximum (FWHM) of approximately 5-20 nm, such as approximately 10 nm.

Optionally, the light transmitter has a spectrally overlapping transmitter channel transmitting light in wavelength bands around 660, 730, 770, 840, 880 or 950 nm. Optionally, the wavelength bands have a FWHM of approximately 20-50 nm. The light transmitter can e.g. include transmitter channels around 660, 730 and 770 nm.

According to an aspect, the processing unit is arranged for calculating a vegetative index on the basis of light received by the plurality of receiver channels.

According to an aspect, the processing unit is arranged for determining the biomass and/or the nitrogen uptake of the crop canopy.

According to an aspect, the system includes a communication unit arranged for communicating data representative of the determined plant status to a user device, such as a control unit, tablet, smartphone, laptop, computer or the like.

According to an aspect, the system is mounted to a vehicle or moving apparatus. The vehicle can be a surface-based vehicle such as a tractor, mower, robot, unmanned vehicle, autonomous vehicle, etc., or an airborne-vehicle such as a drone, helicopter, airplane, delta plane, kite, balloon, etc.

The moving apparatus can be a center pivot/linear irrigator or the like. Alternatively, the system can be mounted stationary over a representative area of the field to continuously monitor crop growth during the season. Alternatively, the system can be carried by a person in order to manually measure selected areas in the field during field walking.

According to an aspect, the system is arranged for controlling a variable rate applicator system, such as a fertilizer system, an irrigation system, a fertigation system, and in particular a fertilizer spreader mounted on or pulled by a tractor, or the like.

According to an aspect, a method is provided for determining a status of plants. The method includes transmitting broad band illumination to one or more plants using a light transmitter, receiving light from said one or more plants in mutually different wavelength bands by a light receiver including a plurality of receiver channels, and determining by a processing unit a status of said one or more plants on the basis of light received by the plurality of receiver channels.

According to an aspect, the transmitting includes transmitting light in bursts of modulated light.

According to an aspect, the light transmitter includes a plurality of transmitter channels, the transmitter channels being arranged for transmitting light in mutually different wavelength bands, wherein a center wavelength of a wavelength band of at least one of the transmitter channels is different from the center wavelengths of the wavelength bands of the receiver channel.

According to an aspect, the method includes receiving light at a first wavelength of a known reflection or absorption band of interest, receiving light at a second wavelength adjacent to said absorption band of interest, and using the light received at the second wavelength as a reference value in view of light received at the first wavelength.

Optionally, the transmitted broad band illumination is modulated, and the light received by the plurality of receiver channels is detected synchronized with the modulated transmitted light. Optionally, the method includes removing a DC component from a signal representative of the light received by the plurality of receiver channels.

According to an aspect, the method includes controlling a variable rate applicator system, such as a fertilizer system, an irrigation system, a fertigation system, and in particular a fertilizer spreader mounted on or pulled by a tractor, on the basis of the determined status of the plants.

It will be appreciated that any of the aspects, features and options described in view of the system apply equally to the method, and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
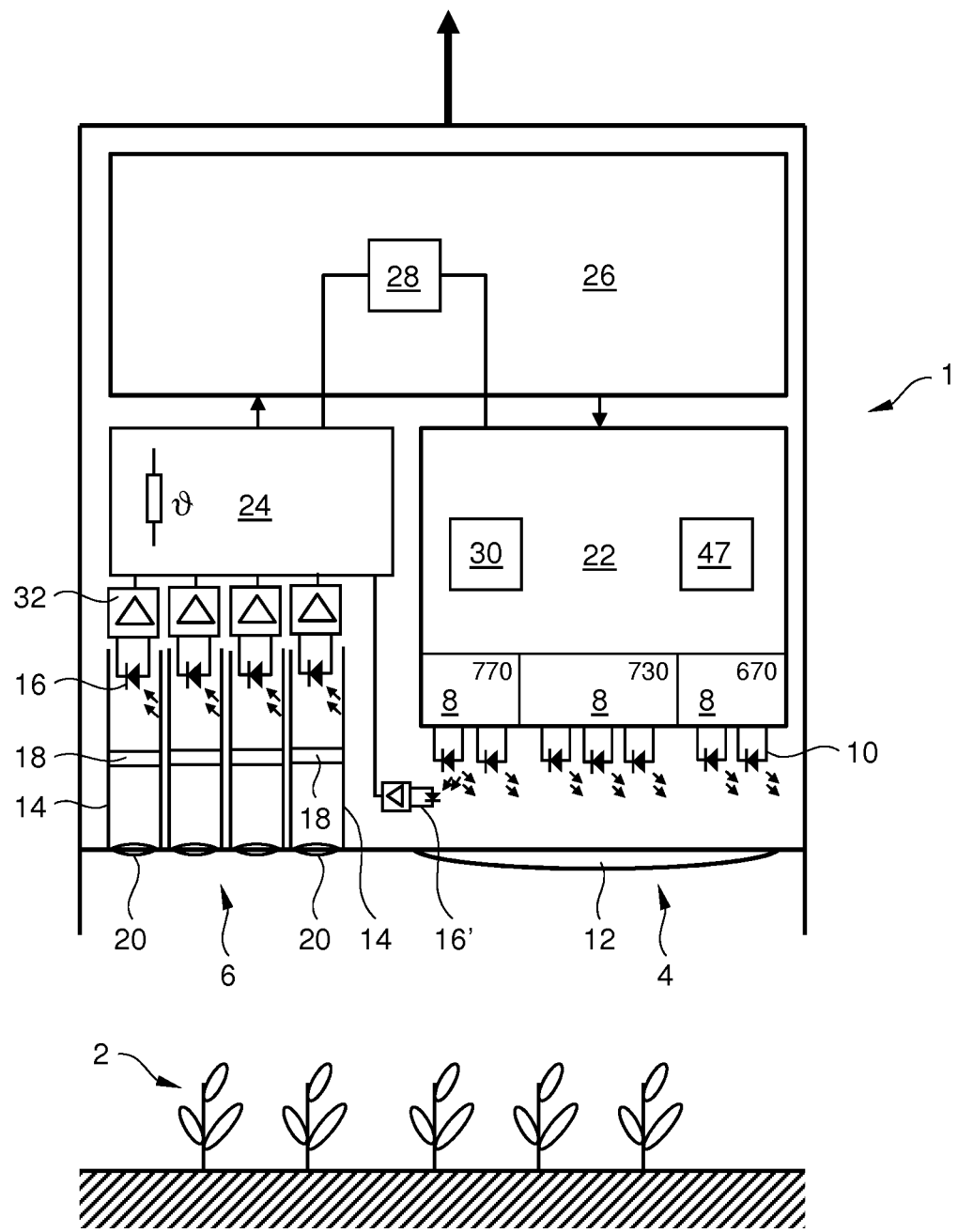
FIG. 1 shows a schematic representation of a system for determining a plant status.

FIG. 1 shows a schematic representation of a system 1 for determining a status of plants 2. The system 1 includes a light transmitter 4 and a light receiver 6. The light transmitter 4 is arranged for providing broad band illumination. In this example, the light transmitter includes three transmitter channels 8. Each light transmitter channel 8 includes at least one light source 10. In this example each transmitter channel 8 includes more than one light source 10. Here the light sources are LED light sources. The number of light sources per channel has been chosen to obtain the desired broadband illumination. The number and the wavelength of light sources per channel can be chosen to obtain the desired broadband illumination. In this example, the light sources are arranged for transmitting light in wavelength bands around 660, 730 and 770 nm respectively. The transmitter 4 includes optics 12 for collimating, focusing or diverging light emitted by the light sources 10 towards plants under study.

The light receiver 6 includes a plurality of receiver channels 14. The receiver channels 14 are arranged for receiving light in mutually different wavelength bands. In this example, each receiver channel 14 includes a light sensor 16, here a photo diode. Each receiver channel 14 includes a bandpass filter 18. The bandpass filters 18 shape the sensitivity of the receiver channels. In this example, the bandpass filters are centered around 670, 730, 740 and 760 nm, respectively. The FWHM is about 10 nm. Each receiver channel 14 includes an optics 20 for focusing light reflected from the plants 2 onto the respective light sensor 16.

Figure 2:
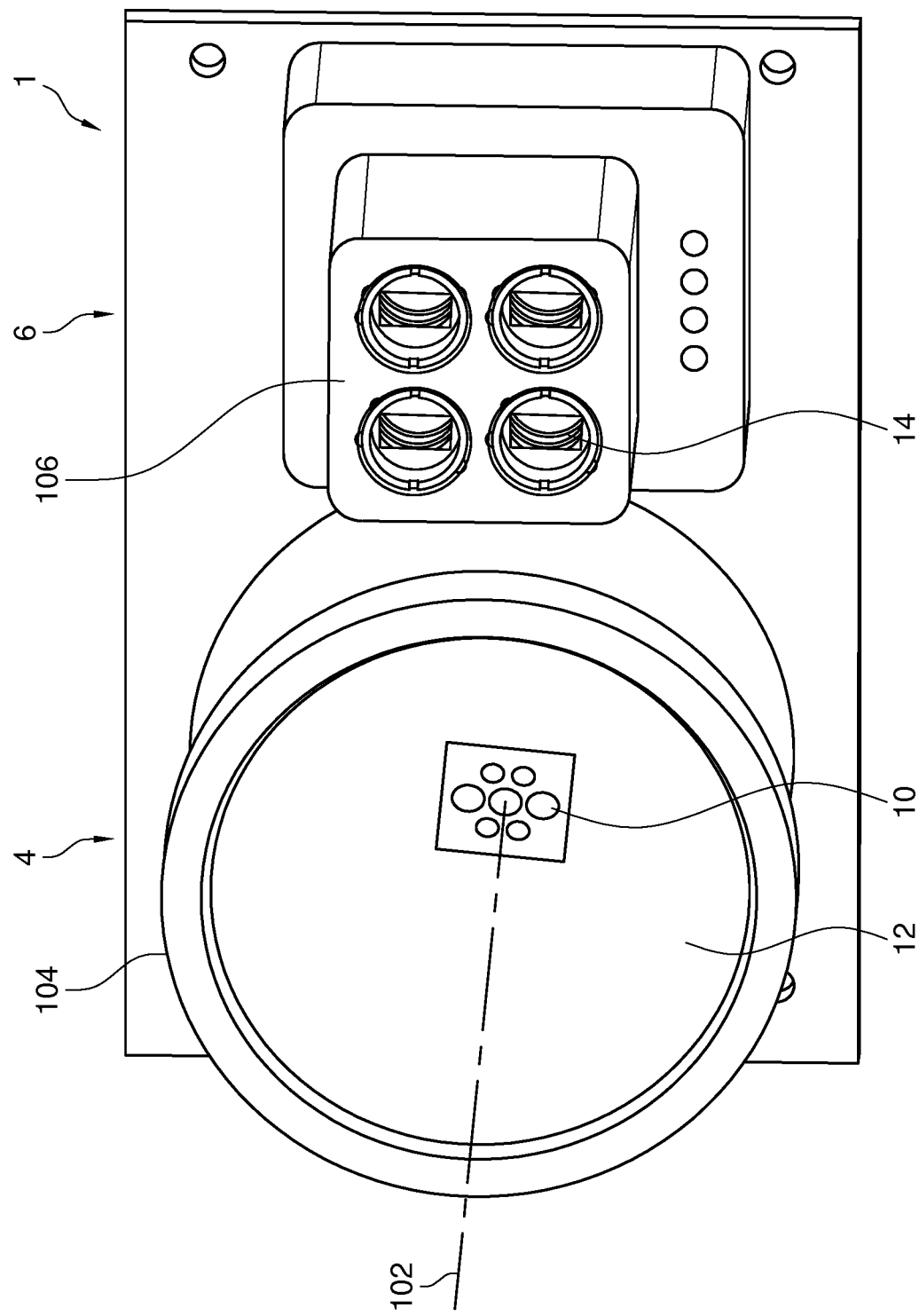
FIG. 2 shows a schematic representation of a system for determining a plant status.

FIG. 2 shows a schematic representation of the system 1. In this example, the light transmitter 4 is shown as a unit having the plurality of light sources 10 close to the optical axis 102 of the light transmitter housing 104. All light sources 10 are placed on a common substrate. Hence the beams at different wavelength bands can show optimum overlap on the plants. In this example, all light transmitter channels 8 share a common optics 12. Optionally, the transmitter channels 8 are optically mixed through dedicated transmitter optics, such that all transmitter channels 8 illuminate along one single optical axis. The light receiver includes a light receiver housing 106. The light receiver housing 106 houses all light receiver channels 14. In this example, the light receiver housing 106 is highly thermally conductive, to minimize temperature difference between the receiver channels 14. The light receiver housing can e.g. be a single block of aluminum.

In the example of FIG. 1, the system 1 includes a light transmitter control unit 22 arranged for controlling the light transmitter channels 8. In this example the system 1 includes a light receiver control unit 24 arranged for controlling the light receiver channels 14. In this example the system 1 includes a processing unit 26.

Here the processing unit includes a signal generator 28 arranged for generating a carrier signal having a carrier frequency $f_c$. The carrier signal is fed to both the light transmitter 4 and the light receiver 6.

Figure 3:
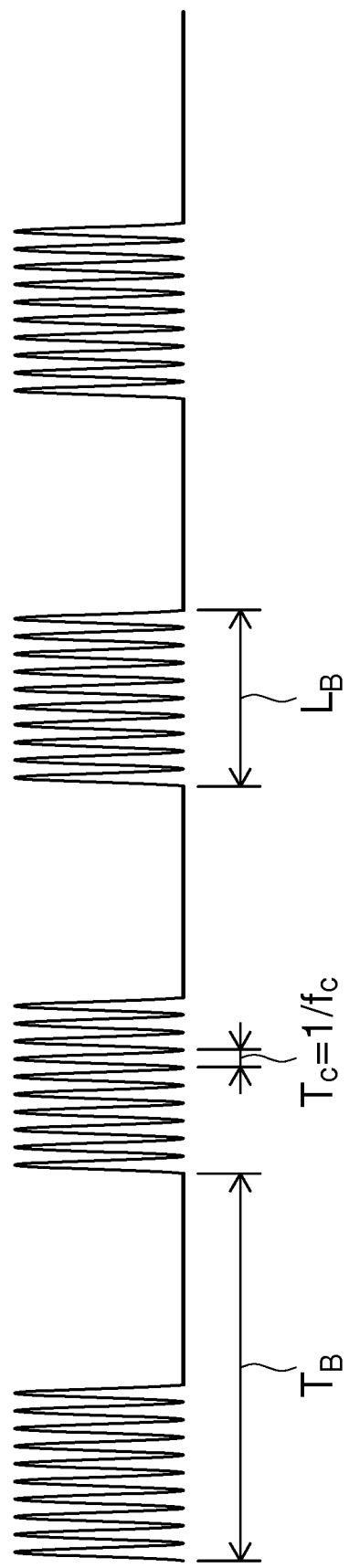
FIG. 3 shows a schematic timing diagram.

The light transmitter control unit 22 includes a timing generator 30 for generating a timing signal. In this example, the timing signal is a periodic signal including a burst B having a burst repetition frequency (or burst repetition time $T_B$) and a burst length $L_B$. The light transmitter control unit 22 is arranged for switching the light sources 10 on and off between the bursts. The light sources 10 are switched on and off in a time sequence according to the burst repetition frequency and burst length, wherein during the burst the light sources are modulated by varying the light intensity in shape of the modulating frequency. In FIG. 3, this is represented as a sine wave with 0% to 100% of light intensity. Switching the light sources 10 on and off according to the carrier frequency can be done at a duty cycle of 50%, or at any desired duty cycle. The duty cycle can e.g. be adjusted according to need. For example, the burst frequency can be 10 Hz (10 bursts per second). A burst length can e.g. be 250-1000 µs. The carrier frequency can e.g. be 100 kHz.

During the burst, the light emitted by the light transmitter 4 is modulated by varying the light intensity in shape of the modulating frequency to allow to obtain a signal independent from the natural radiation conditions. The light receiver 6 successively receives a pure background signal due to natural light irradiation, and the sum signal of light transmitter and natural irradiation. By DC blocking (the AC-coupled current to voltage converter, AC-CV, converts only the AC part (or modulated part) of the receiving signal. Hence the background light with it's DC part is blocked by the AC coupled current to voltage converter), the component of the light received in response solely to the output of the light transmitter 4, can easily be determined. Hence, since the transmitter emits modulated light, the plants reflect modulated light with wavelength specific intensities according to their spectral response. The receiver channels receive all light (in their respective wavelength band) but signals that are not modulated with the same frequency and phase as the modulating frequency can not pass the electronics.

Figure 4:
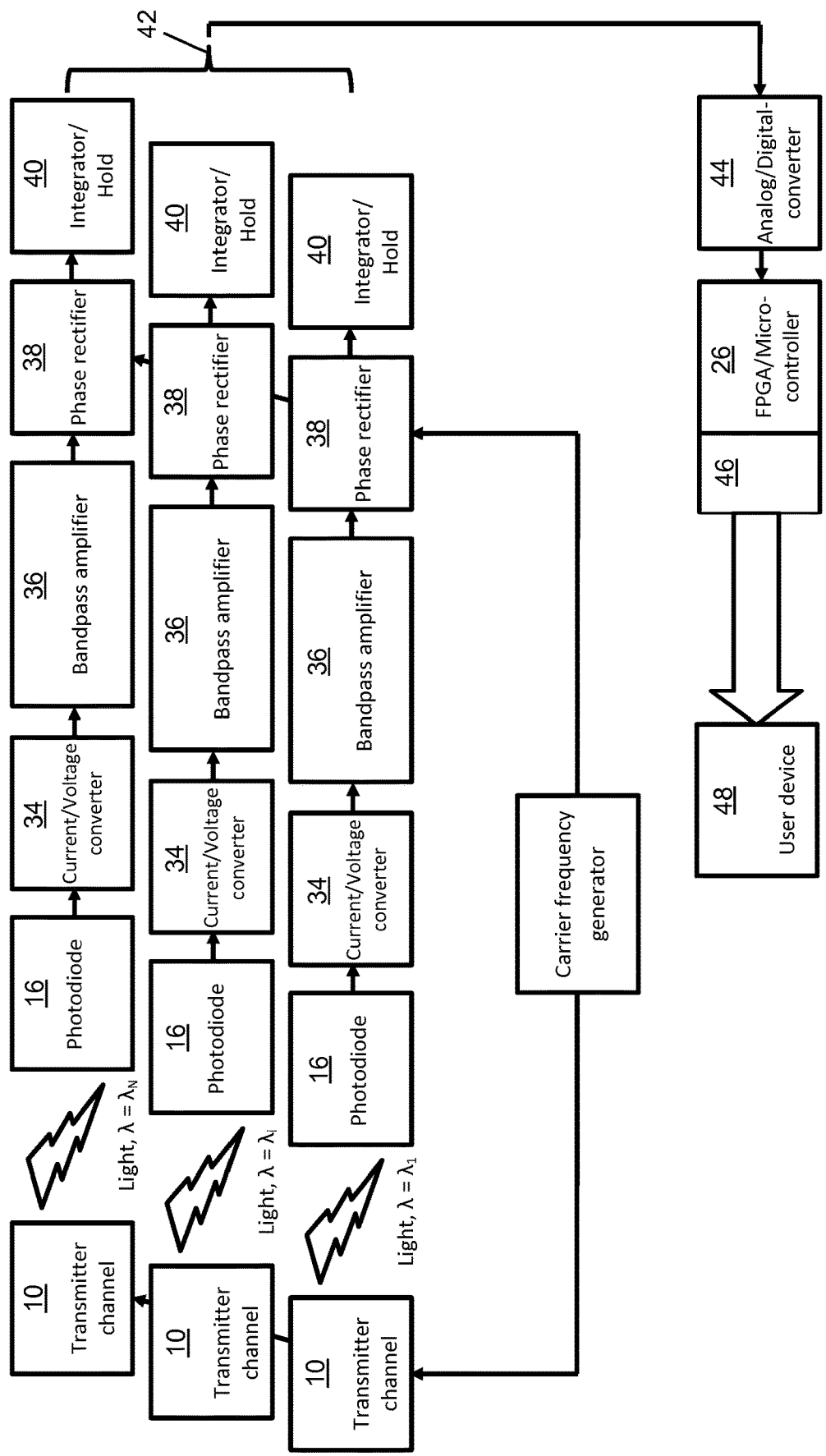
FIG. 4 shows a schematic representation of a receiver.

In this example, each receiver channel 14 has its own processing electronics 32. FIG. 4 shows a schematic example in which the processing electronics 32 are subdivided in units. In this example the light sensor 16 is a photo diode. The current generated by the light sensor 16 is converted into a voltage by the AC-coupled current-voltage converter 34. The resulting voltage is amplified by bandpass amplifier 36. In this example the bandwidth of the amplifier is 20 kHz. Preferably, the AC-current to voltage converter and the bandpass amplifier strip any DC component from the signal. It will be appreciated that the AC component of the signal corresponds to the difference between the summed ambient and background signal (during a pulse) and the background signal (between pulses). Hence, this suppresses ambient light. In this example, there is no measurement of the background signal. The background signal is stripped off by the electronics. The background signal is mainly defined by a DC component and the AC component is generated by the light transmitter. Therefore, background suppression comes with the DC blocking of the AC-CV together with the bandpass amplifier. Thus, the measured signal coming from the bandpass amplifier does not contain a background component. Nevertheless, to get information about the measurement electronics (e.g. thermal deviations or other) it can be useful to get measurement data from a time interval between the bursts. In this time interval the light is switched off (AC component is zero) and the measurement signal is only the dark signal response of the electronics. However, since in this case too the DC signal is stripped from the measured signal, the term "dark signal" does not imply that such signal includes a signal relating to "background illumination".

Next, the AC signal is rectified by a phase rectifier 38 for obtaining the amplitude of the signal. It is noted that the phase rectifier can be connected to the signal generator 28, so that the received signal can be rectified in synchronization with the transmitted light pulses. Any AC signal components that remained after removing of the DC component, and that are not in phase with the modulation signal (thus possibly not caused by the modulated illumination) are also stripped at this point.

The rectified signal is fed to an integrator and hold circuit 40. The integrator integrates the signal over a predetermined period of time. This aids in reducing noise. The integration time can be matched to the length of the bursts. The integration time can e.g. be 250-1000 µs.

The light receiver control unit 22 includes an electronic switch or multiplexer 42. The hold circuits 40 holds the determined integrated values until the multiplexer 42 feeds the respective integrated signals to an analog-to-digital converter 44.

In this example, the system further includes an additional light sensor 16' for determining intensity of the light sources 10. Hence, any deviation in light output, e.g. due to temperature, ageing, etc., can be compensated for. Also, the additional light sensor allows for monitoring the light sources 10 for malfunction. For this purpose the individual light sources 10 can for instance be turned on sequentially one after the other and the resulting signal is measured using the additional light sensor 16'. It will be appreciated that it is possible to include a dedicated additional light sensor 16' for each light source 10 or for each light transmitter channel 8.

In this example, the processing unit 26 receives the digital values representative of the light received at the respective receiver channels. The processing unit 26 is arranged for determining a status of the plants 2 on the basis of the received values. The processing unit 26 can e.g. be arranged for determining a nutritional status of the plants 2 on the basis of the received values. The values determined by the processing unit, representative of the light intensity received by the respective light sensors 26 are indicated as $R_{670}$, $R_{730}$, $R_{740}$, and $R_{760}$ in this example, referring to the center wavelengths of the respective receiver channel bandpass filters. It is noted that the edge of the chlorophyll absorption band is situated at approximately 730 nm. Therefore, the value of $R_{730}$ is representative of the amount of chlorophyll within the field of view of that receiver channel. Hence, the receiver channel having a center wavelength about 730 nm can be classified as chlorophyll receiver channel. Transmitting the light as the modulated bursts and the phased rectifying already cancels effects of ambient illumination. Hence, it makes no difference whether the measurement is performed by day or by night. By comparing the value at the chlorophyll absorption band, $R_{730}$, with a value outside the chlorophyll absorption band, here $R_{760}$, allows to correct for the amount of reflected light that does not contribute to the chlorophyll measurement, such as reflection on soil. The receiver channel having a center wavelength about 760 nm here qualifies as chlorophyll reference receiver channel. It will be appreciated that for the chlorophyll reference receiver channel any center wavelength outside the chlorophyll absorption band can be chosen, such as, but not limited to, 750, 755, 760, 765, 770, 775, 780, or 785 nm, for instance the 760 nm mentioned above. Hence, the processing unit 26 can e.g. determine the ratio $R_{760}/R_{730}$ as index representative of chlorophyll.

There is a relationship between the total amount of chlorophyll and the total amount of nitrogen within a crop canopy. Hence, crop nitrogen requirements can be determined based on measurement data collected from the crop canopy. Plants with increased levels of nitrogen typically have produced more chlorophyll and more biomass. Hence, plants that appear a darker green are perceived to be healthier than nitrogen deficient plants. Hence, it possible to remotely sense or measure canopy greenness and obtain an indication of chlorophyll amount and nitrogen uptake. When the determined absorption at the chlorophyll absorption band is high, the total amount of chlorophyll in the plants can be assumed to be high, and the nitrogen levels of the plants can be assumed to be high. Hence, the processing unit can determine a plant nutritional status. After proper calibration in dedicated field trials, nitrogen uptake can e.g. be calculated from $S_N = 100 * C_c * (R_{760}/R_{730} - 1)$, wherein $C_c$ can be a calibration function or calibration constant determined in calibration. It is also possible that the $R_{760}$ and $R_{730}$ are calibrated individually.

In order to suppress the effects of dew and dust on the plants, a further correction can be made, using the value determined by a reference receiver channel, here the receiver channel with the center wavelength about 670 nm. By subtracting the value of the light intensity received by the reference receiver channel from the value of the chlorophyll receiver channel and from the value of the chlorophyll reference receiver channel this further correction may be obtained. Hence, the processing unit 26 can e.g. determine the ratio $(R_{760} - R_{670})/(R_{730} - R_{670})$ as corrected index representative of chlorophyll. Again nitrogen uptake can be calculated from $S_N' = 100 * C_d * ((R_{760} - R_{670})/(R_{730} - R_{670}) - 1)$ after proper calibration. Herein $C_d$ can be a calibration function or calibration constant determined in calibration. It is also possible that the $R_{760}$, $R_{670}$ and $R_{730}$ are calibrated individually.

Instead of, or in addition to, determining chlorophyll, or nitrogen uptake, above ground, e.g. dry, biomass can be determined. Thereto, different wavelength bands may be used, e.g. based on a water absorption band such as at 970 nm. A water receiver channel can be defined having a center wavelength about 970 nm. A reference water receiver channel can be defined having a center wavelength about 900-930 nm, e.g. 900 nm. The biomass determination can be independent of chlorophyll. Dry mass can e.g. be calculated from $S_{DM} = 100 * C_w * (R_{900}/R_{970} - 1)$ or from $S_{DM}' = 100 * C_w * ((R_{900} - R_{670})/(R_{970} - R_{670}) - 1)$, wherein $C_w$ can be a calibration function or calibration constant determined in calibration. It is also possible that the $R_{900}$, $R_{670}$ and $R_{970}$ are calibrated individually.

The processing unit 26 is arranged for making the results of the measurements knowable to a user. Thereto, the processing unit 26 can include a communication unit 46. The communication unit 46 is arranged for transmitting the measurement results, e.g. the plant status, such as nitrogen uptake or biomass, to a user device 48. The communication can be wired or wireless. The user device 48 can include a control panel. The control panel can include a display and/or controls. The user device can be a tablet. The user device can be a smartphone.

The light transmitter control unit 22 in this example includes a temperature control unit 47. The temperature control unit 47 is arranged for controlling the temperature of the transmitter channels 10 to avoid, or at least reduce, wavelength and/or intensity drift. Here the transmitter channels are maintained at an elevated temperature above ambient temperature. The temperature can e.g. be maintained at about 50±1° C.

Figure 5A:
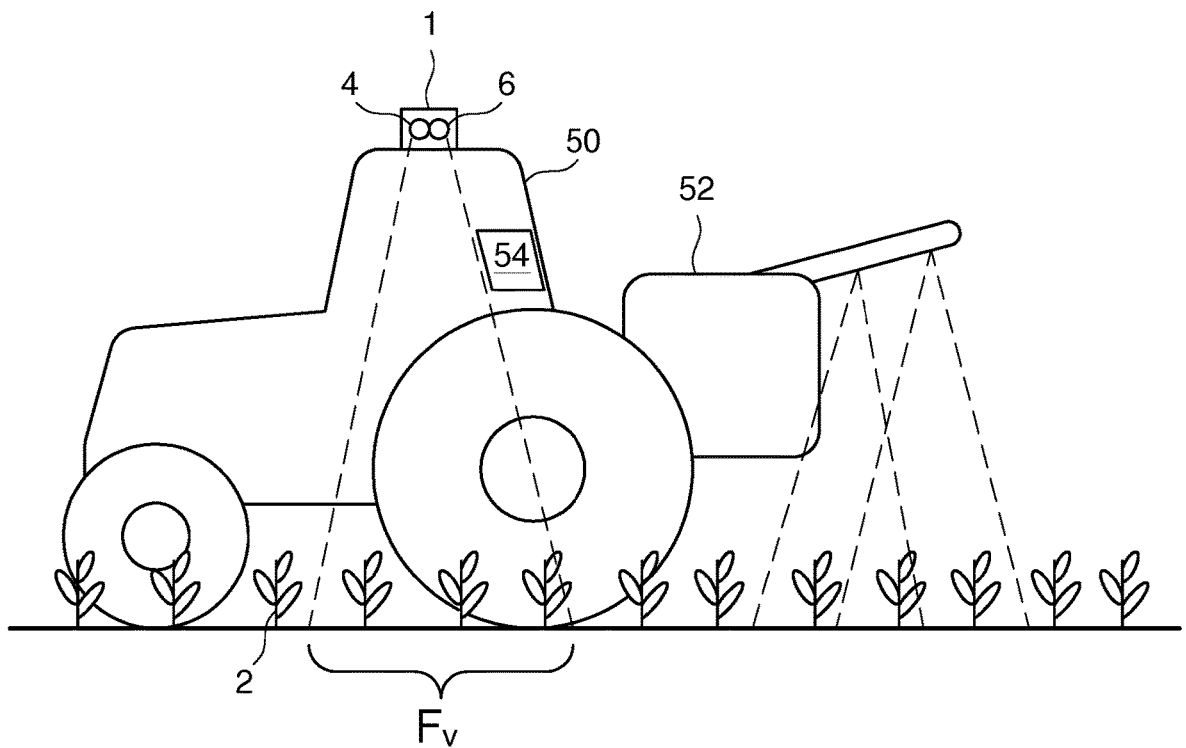
FIGS. 5A and 5B show a schematic representations of a system.
Figure 5B:
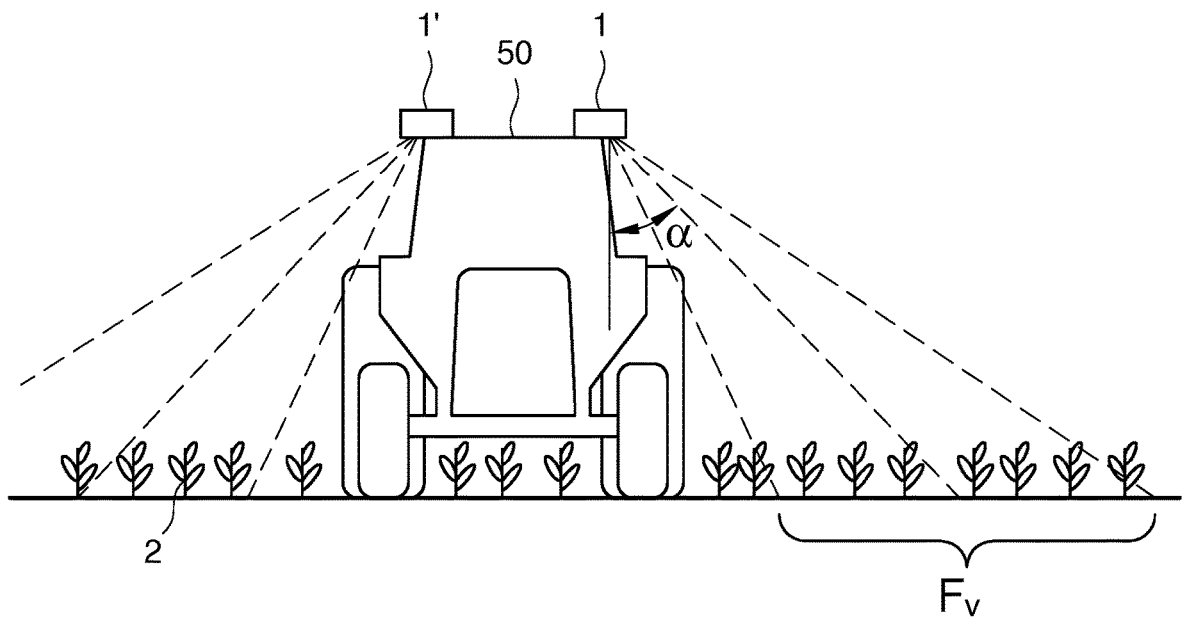

FIGS. 5A and 5B shows a schematic representation of a system 1. In this example, the system 1 is attached to a tractor 50. Here the system 1 is positioned at a cabin roof of the tractor 50. The light transmitter 4 is aimed at the ground at an angle α. In this example, the angle α is approximately 50°, however, other suitable angles can be selected. The light receiver 6 is also aimed at the ground, here at the same angle α. The light receiver 6 receives light reflected from the plants within the field of view Fv. It is noted that in this example a second system 1' is also attached to the tractor, to allow for simultaneous detection on both sides of the vehicle.

As explained above, the light transmitters 4 of the systems 1, 1' transmit the light in bursts at the burst frequency. In this example, the systems 1, 1' are synchronized. Here the synchronization is such that the light transmitters are operated out of phase, that is, the systems 1 and 1' alternately transmit a burst. This can help in preventing power consumption peaks.

When the vehicle moves and thus passes plants, the burst frequency is preferably such that fields of view of the individual measurements overlap by at least half of the field of view.

In this example, the tractor 50 is further provided with a fertilizer distribution unit 52. The fertilizer distribution unit 52 is connected to a control unit 54. The control unit 54 receives application rates calculated from the plant status, such as e.g. the nitrogen uptake, from the processing unit 26. The control unit 54 controls dispensing of fertilizer on the basis of the received data. Since the data can be provided to the control unit 54 in real time, or with minimal delay, it is possible to control dispensing of the fertilizer on the basis of each individual measurement for the plants with the field of view during that measurement.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

For example, in the example of FIG. 5 a fertilizer distribution unit is shown. Alternatively, or additionally, the system 1, 1' can be used for providing data representative of a plant status to a control unit of a watering and/or irrigation system.

In the example of FIG. 5, the system 1, 1' is positioned at a roof of the tractor. It will be clear that the system can also be positioned elsewhere, e.g. at a spray boom. It will also be clear that the system can be attached to a different moving structure than a tractor, for example to a mower, center pivot/linear irrigator, or the like.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for determining a status of plants, comprising:
   a light transmitter arranged for providing broad band illumination to one or more plants;
   a light receiver including a plurality of receiver channels, the receiver channels arranged for receiving reflected light from said one or more plants in mutually different wavelength bands; and
   a processing unit arranged for determining a status of said one or more plants on the basis of the reflected light received by said plurality of receiver channels;
   wherein a light transmitter control unit is arranged to cause the light transmitter transmit bursts of modulated light, and
   wherein the light receiver is arranged for detecting light synchronized with the modulated transmitted light.

2. The system according to claim 1,
   wherein the light transmitter includes a plurality of transmitter channels, the transmitter channels being arranged for transmitting light in mutually different wavelength bands, and
   wherein the number of transmitter channels is different from the number of receiver channels.

3. The system according to claim 1, wherein the transmitter channels are optically mixed through dedicated transmitter optics to one single optical axis.

4. The system according to claim 1, wherein the intensities of the individual transmitter channels are monitored through an optical receiver situated inside the transmitter optics.

5. The system according to claim 1, wherein each receiver channel includes a light detector, an AC-coupled current to voltage converter, a bandpass-AC-amplifier, a phase rectifier, an integrator, and a hold circuit.

6. The system according to claim 5, wherein the receiver includes a multiplexer and an analog to digital converter.

7. The system according to claim 1,
   wherein each receiver channel includes a light detector and dedicated optics, and all receiver channels are mounted in a common receiver frame.

8. The system according to claim 1, wherein the processing unit is arranged for calculating a plant status, on the basis of light received by the plurality of receiver channels.

9. The system according to claim 1, wherein the light received by the plurality of receiver channels is indicative for the chlorophyll content of the one or more plants illuminated by the broad band illumination.

10. The system according to claim 1, further comprising a communication unit arranged for communicating data representative of the determined plant status to a user device.

11. The system according to claim 1, further comprising a first receiver channel arranged for receiving light at a first wavelength of a known reflection or absorption band of interest, and a second receiver channel arranged for receiving light at a different second wavelength,
   wherein the system is arranged for using light received by the second receiver channel as a reference value in view of light received by the first receiver channel.

12. The system according to claim 11, wherein the first receiver channel is tuned to an edge of a chlorophyll absorption band, and the second receiver channel is tuned to a different wavelength.

13. The system according to claim 12, wherein the first receiver channel is tuned to a water absorption band, and the second receiver channel is tuned to a different wavelength.

14. The system according to claim 11, further comprising a third receiver channel arranged for receiving light at a third wavelength different from the first and second wavelengths,
   wherein the system is arranged for using light received by the third receiver channel as a reference value in view of light received by the first receiver channel and in view of light received by the second receiver channel.

15. The system according to claim 14, wherein the system is arranged for subtracting a signal received by the third receiver channel from the signal received by the first receiver channel and from the signal received by the second receiver channel before determining a ratio thereof.

16. The system according to claim 1, wherein the system is further arranged for controlling a variable rate applicator system.

17. A method for determining a status of plants, comprising:
   transmitting broad band illumination to one or more plants using a light transmitter, wherein the light is transmitted in bursts of modulated light;
   receiving light in mutually different wavelength bands from said one or more plants by a light receiver including a plurality of receiver channels, wherein the light received by the plurality of receiver channels is detected synchronized with the modulated transmitted light; and
   determining by a processing unit a status of said one or more plants on the basis of light received by the plurality of receiver channels.

18. The method according to claim 17,
   wherein the light transmitter includes a plurality of transmitter channels, the transmitter channels being arranged for transmitting light in mutually different wavelength bands, and
   wherein a center wavelength of a wavelength band of at least one of the transmitter channels is different from the center wavelengths of the wavelength bands of the receiver channel.

19. The method according to claim 17, further comprising receiving light at a first wavelength of a known reflection or absorption band of interest, receiving light at a different second wavelength, and using the light received at the second wavelength as a reference value in view of light received at the first wavelength.

20. The method according to claim 17, further comprising removing a DC component from a signal representative of the light received by the plurality of receiver channels.

21. The method according to claim 17, further comprising controlling a variable rate applicator system, on the basis of the determined status of the plants.

* * * * *